June 22, 1943.  H. EICKEMEYER  2,322,428
FILTER SYSTEM AND APPARATUS
Filed June 23, 1939  3 Sheets-Sheet 1

INVENTOR.
Henry Eickemeyer
BY
ATTORNEYS.

June 22, 1943. H. EICKEMEYER 2,322,428
FILTER SYSTEM AND APPARATUS
Filed June 23, 1939 3 Sheets-Sheet 2
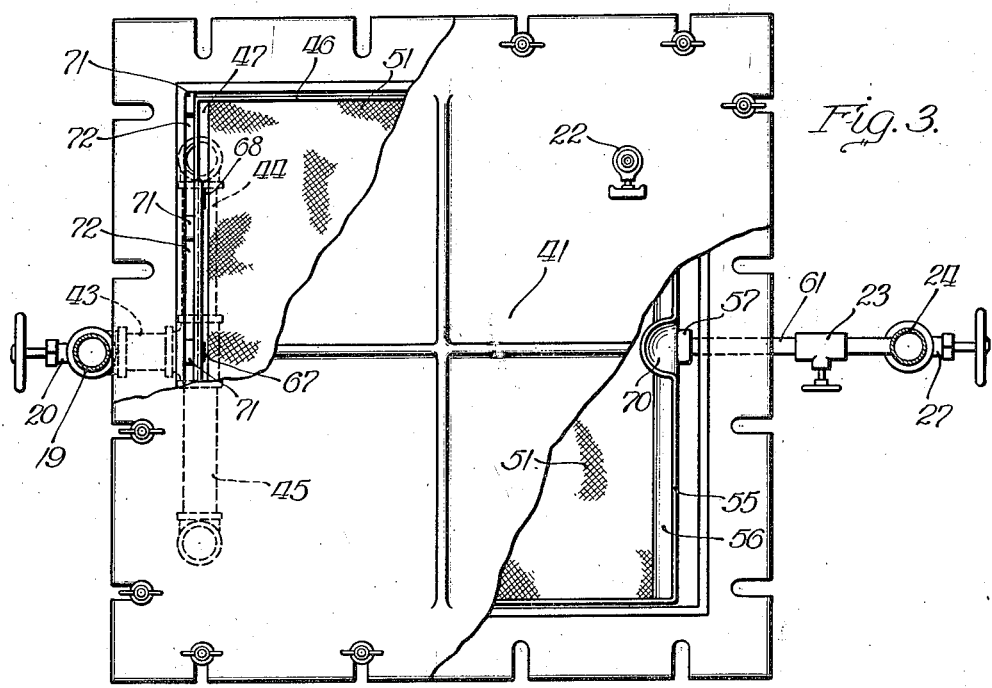
Fig. 3.
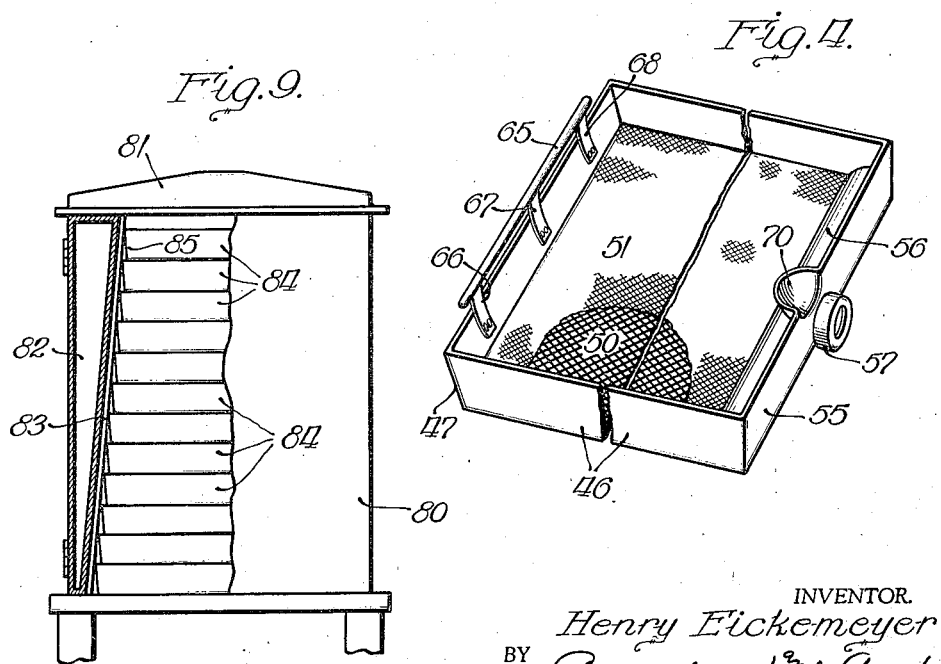
Fig. 9.
Fig. 4.
INVENTOR.
Henry Eickemeyer
BY
ATTORNEYS.

June 22, 1943. H. EICKEMEYER 2,322,428
FILTER SYSTEM AND APPARATUS
Filed June 23, 1939 3 Sheets-Sheet 3
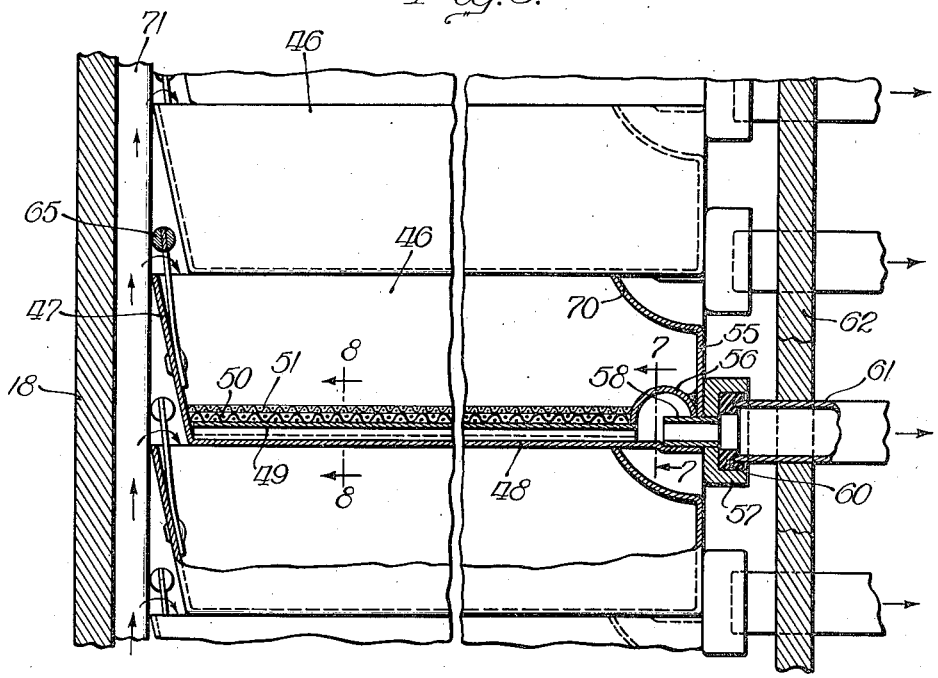
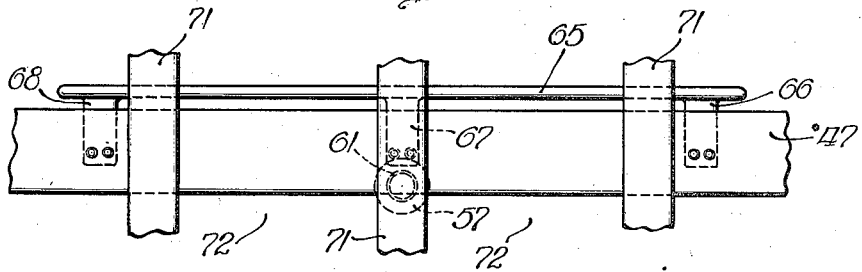
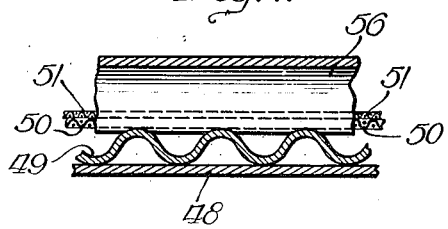
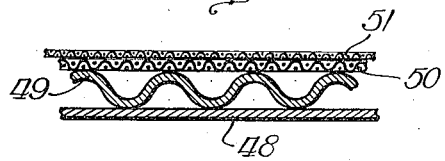
INVENTOR.
Henry Eickemeyer
BY Richardson
ATTORNEYS.

Patented June 22, 1943

2,322,428

UNITED STATES PATENT OFFICE 2,322,428

FILTER SYSTEM AND APPARATUS

Henry Eickemeyer, Chicago, Ill., assignor to George Auer, Chicago, Ill.

Application June 23, 1939, Serial No. 280,830

13 Claims. (Cl. 210—173)

My invention relates to a new system and apparatus for filtering liquids, and is particularly concerned with improvements in filter presses wherein filter material is precipitated on a plurality of individual filter beds, and with improvements in the arrangement of parts for supplying to the filter press the liquid to be filtered and for removing the filtered product therefrom in a more efficient manner than was heretofore possible.

The various objects and features of the invention are described below in detail with reference to the accompanying drawings, wherein—

Fig. 3 is a top view of the press shown in Fig. 2, with parts of the lid or cover broken away to indicate interior parts;

Fig. 4 shows in perspective view an embodiment of a new filter pan designed to form an individual filter bed;

Fig. 5 represents a section through a number of filter beds or pans on an enlarged scale;

Fig. 6 illustrates a partial front view of the new filter pan in relation to certain inlet channels of the filter press housing;

Figs. 7 and 8 are sections along similarly marked lines in Fig. 5; and

Fig. 9 is a diagrammatic view of a modified filter press.

Like parts are indicated in the drawings by like reference numerals. Details and elements which are known in the art will be described in the following only to the extent required to support the understanding of the invention.

Figure 1:
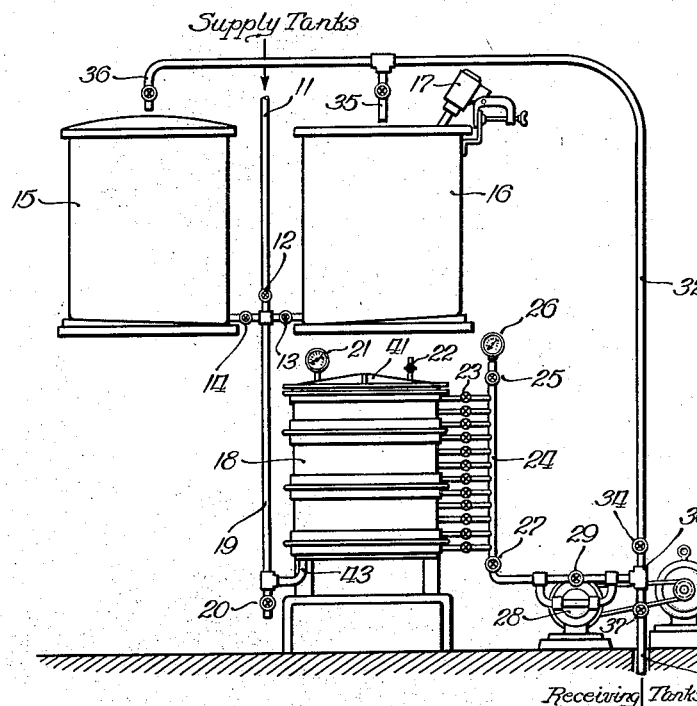
Fig. 1 is a more or less diagrammatic representation of the improved system and its principal component parts.

Referring now to Fig. 1, the system comprises a pipe 11 which is connected to a suitable supply tank or tanks wherein the liquid to be filtered is originally deposited. This pipe is connected by way of the valves 12, 13, 14 with the solvent tank 15 and a mixing tank 16, the latter being equipped with a suitable mixer 17. A filter press comprising the housing 18 is disposed below the tanks 15 and 16, as indicated, and is connected therewith by way of the pipe line 19. Numeral 20 indicates a drain for the filter press; 21, a pressure gauge; and 22, an air vent valve. Arranged in this filter press are a number of horizontally disposed individual filter beds—in this particular case twelve beds—each having an individual valve-controlled outlet as generally indicated by the numeral 23 at the right side of the tank 18. These individual outlets terminate in a common outlet 24 provided with a valve 25 and a pressure gauge 26 and connected through the valve 27 with the vacuum pump 28. 29 is a valve controlling a by-pass terminating in the distributor 30 which, if desired, may be a three-way valve. The motor for driving the pump is shown at 31. Branching from the distributor 30, or, if such is provided, from the corresponding three-way valve, are the pipe lines 32 and 33, the first leading over a valve 34 to the valve-controlled outlet 35 for ejecting liquid into the mixing tank 16 and to the valve-controlled outlet 36 for ejecting liquid into the solvent tank 15. The pipe line 33 is equipped with a valve 37 and leads to a receiving tank or tanks for collecting the filtered product. The valves 34 and 37 can be omitted if a three-way valve is used in place of the distributor 30.

The operation of this system will be described presently in detail, after explaining some of the new interior mechanism of the filter press with reference to Figs. 2 to 8, inclusive.

The improved filter press comprises the housing 18 having a bottom 40 and a removable lid or cover 41 on which are disposed the previously mentioned pressure gauge 21 and the air vent 22. The attachment of the lid or cover 41 may be made in accordance with any known and suitable structure. The pipe line 19 connects with the bottom 40 of the tank over the angular pipe 43 which is provided with two branches 44 and 45 (Fig. 3). The liquid is thus introduced into the tank or filter press marginally from the bottom, rising within the filter press and filling the individual filter beds in a manner which will be better understood after a detailed description of one of the filter pans shown, for example, in Fig. 4 in perspective view, in Fig. 5 in longitudinal section, in Fig. 6 in front view, and in Figs. 7 and 8 in partial sections to illustrate the detail structures incorporated therein.

This filter pan, indicated in these figures by numeral 46, may be a rectangular structure with one end or side wall 47 sloping downwardly and inwardly. The bottom 48 of this pan is lined with a waved member 49 providing parallel channels leading rearwardly from the sloping front wall 47. If desired, the bottom of the pan may be made in wave form and the separate wave-shaped member may then be omitted. This member is essentially a spacer providing a filter chamber, and any structure by which this object is achieved may take its place. Disposed on this waved member are a plurality of screens, for example, a coarse screen 50 and a fine screen 51, as indicated. If desired, a single screen may, of course, take the place of the two screens shown. Liquid filtering through these screens downwardly will fill the parallel channels noted in Figs. 7 and 8, and the liquid will thus be conducted rearwardly in the direction of the wall 55 of the pan and into the tubular collector member 56 which may be welded to the pan or attached to it in any other convenient manner. Also welded to the rear wall 55 of the pan is an outlet bushing 57 with a tubular member 58 extending into the space of the collector member 56, as is particularly indicated in Fig. 5. The bushing 57 is provided with a gasket, e. g., a rubber gasket 60, for making connection with the tubular outlet stud 61 provided for this particular filter bed or pan and firmly attached to the wall 62 of the tank housing. The downwardly sloping wall 47 of the filter pan is provided with a handle 65 which is resiliently mounted, for example, by means of the leaf springs 66, 67 and 68. The fastening or fulcrum points of these leaf springs or of equivalent attachment means should be disposed low, near the surface of the top screen. The rear wall 55 of the filter pan is provided with a receding lip 70 so as to provide a recess for accommodating the downwardly-protruding outlet bushing of the filter pan disposed immediately above the filter pan described when this adjacent filter pan is moved in and out of operating position. Each and every filter pan in this embodiment is of like structure and dimensions and each pan constitutes a separate filter bed.

Figure 2:
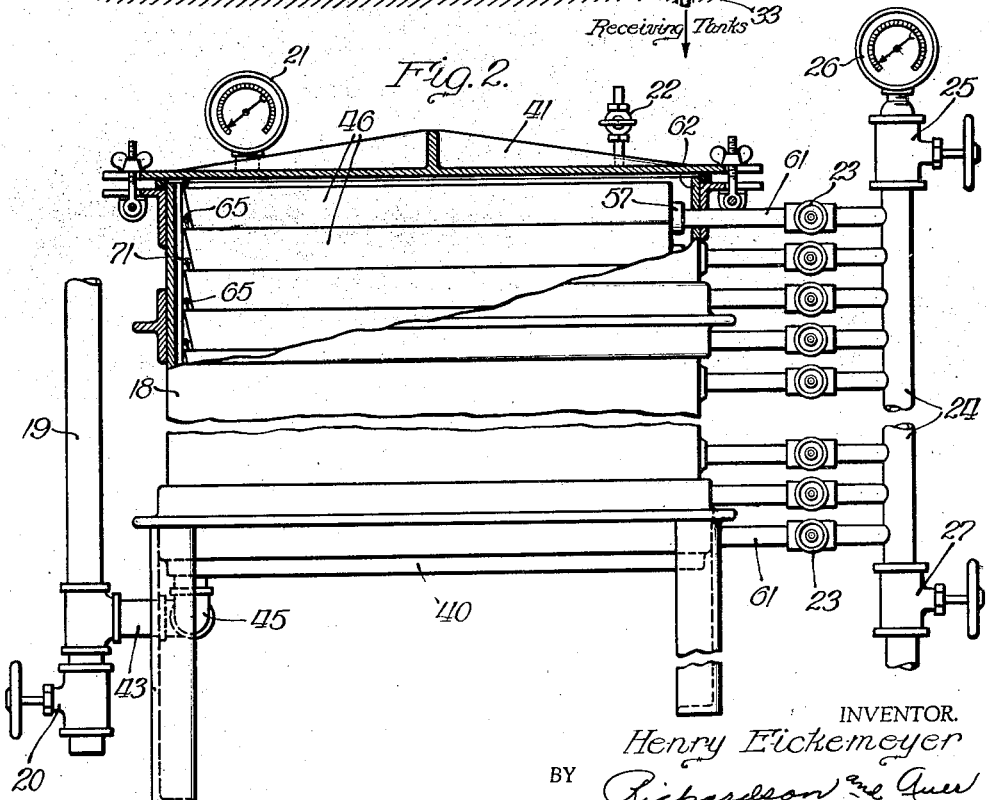
Fig. 2 illustrates a side view of one embodiment of the new filter press with some parts broken away and in section so as to emphasize details.

Returning to the structure of the tank, the rear wall 62 is provided with fixed outlet studs 61, one for each of the filter pans or beds disposed in the apparatus. Each outlet stud is equipped with a quick-acting valve such as 23, and these valve-controlled outlet studs terminate in the common outlet 24 which is equipped with the top valve 25 and the pressure gauge 26, as well as with the bottom outlet valve 27, as previously mentioned and as shown in Figs. 1 and 2. The inside of the front wall 18 of the tank is lined with a plurality of vertically-extending spacer strips 71. The spaces 72 between these strips or bars 71 constitute vertically-extending channels which communicate with the inlets 44 and 45 for receiving the liquid to be filtered and conducting the liquid upwardly so as to flood the filter beds.

It shall be assumed, for the purpose of description, that the filter press is empty, that is, that the individual filter beds (pans) have been removed therefrom. The inside wall 18 of the tank is lined with the spacer strips 71, and the outlet studs 61 project into the inside of the tank from the rear wall 62. The lowermost pan may now be inserted in a tilted position so as to align its outlet bushing 57 with the lowermost outlet stud 61, whereupon the sloping end of the filter pan is lowered into edgewise engagement with the spacer strips 71 to form the lowermost filter bed. The resiliently mounted handle 65 of this pan also engages the spacer strips and the spring action of the handle mounting exerts a pressure tending to drive the entire pan rearwardly, thereby tightening the engagement of the outlet stud 61 with the gasket 60 of this pan. It may be remarked at this point that the material for the gasket should be chosen so as to meet the requirements of the liquid to be filtered. The parallel outlet channels in the filter pan underneath the filter screens are now in leakproof connection with the outlet 61 through which the filter liquid will be withdrawn. Each of the other pans is inserted in the same manner, and the lid or cover 41 is attached after all the pans are in place. Substantially the entire space within the tank is now taken up by the filter pans, dividing the tank into a plurality of individual filter compartments or filter beds, each separated from the other but each connected with the inlet channels 72 through which the liquid to be filtered is introduced. The liquid flows through these channels upwardly in the direction of the arrows shown at the lower left hand side of Fig. 5, and the liquid flows into and floods the pans around the spaces provided by the inwardly-sloping walls 47 of the pans. The in-flow of the liquid is also marked in Fig. 5 by arrows.

The operation, referring to the system shown in Fig. 1, is as follows:

Suitable filter material, for example, asbestos, or any other suitable and required material in flake, powder or comminuted form, is placed in the mixing tank 16. The valves 12 and 13 are then opened and the liquid to be filtered is introduced into the tank 16 from the supply tanks by way of the pipe 11. The mixer 17 is then started, to intermix the filter material thoroughly with the liquid (the valves 12 and 13 having been closed during this operation), whereupon the valve 13 is opened so as to introduce the liquid intermixed with the filter material into the filter press 18. The liquid containing the filter material flows downwardly through the pipe 19 to the connection 43 and, therefore, through the two-way inlet 44 and 45 upwardly along the channels 72 (see particularly Figs. 3, 5 and 6), flooding the filter beds along the line of flow indicated by the arrows in Fig. 5. The air vent 22 provided on the cover 41 may be opened during the filling of the tank so as to permit the air in the tank to escape. After the filter press is filled, the pump 28 is started, to produce a vacuum for the withdrawal of the liquid in each filter bed and through the filter screens disposed in each bed. The vacuum is propagated over the common outlet 24 and the individual outlet valves 23, and is effective to the tubular space provided in each filter bed by the tubular collector members 56. Valve 34 and the valve controlling the outlet 35 are opened, and the liquid is now withdrawn from the filter beds and is pumped by way of pipe 32 back into the mixing tank 16, where the condition of the liquid in-flow can be readily observed by the operator at the inlet stud 35. There is thus a circulation of this liquid through the filter beds, and the filter material previously introduced into this batch of liquid and intermixed with it in the mixing tank 16 is precipitated on the filter screens in each individual filter pan or bed, providing a filter layer thereon which is suitable for functioning as a fine filter for carrying out a continuous filtering process.

When the operator notices a clear flow of circulating liquid at the inlet 35 into the mixing tank, he knows that the precipitation phase of the process is completed and thereupon closes the valves 34, 35, and 13 and opens the valves 12 and 37 so as to permit the liquid from the supply tanks to flow through the pipes 11 and 19 directly into the filter tank 18 for parallel filtering through the various filter beds and for direct withdrawal into the receiving tank or tanks by way of valve 37 and pipe 33. The instruments 21 and 26 indicate to the operator at any time during the operation of the apparatus the relative pressure and vacuum, and by the pressure difference of the instruments 21 and 26 he will be able to gauge the progress of the filtering process.

The above described continuous filter process may also be carried out as a pure gravity process by permitting the filtered product to escape over the by-pass controlled by the valve 29 into the receiving tanks by way of pipe 33 without the use of the pump.

The tank 15 may be filled with a suitable solvent when it is desired to subject the apparatus to an internal cleaning. In this case valves 12 and 13 will be closed, and the solvent will flow through the valve 14 and pipe 19 into the filter tank and will flood the filter beds in the same manner as previously described. The solvent may then be withdrawn over the valve 27 by the operation of the pump and may be recirculated through the solvent tank by way of the valve 34, pipe 32 and valve-controlled inlet 36.

The cleaning of the apparatus, requiring the removal of the individual filter pans, is easily accomplished, simply by removing the cover 41, whereupon the individual filter pans can be lifted out from the interior by means of the spring-controlled handles 65. The front of each pan is thereby first lifted up, relieving the pressure of the fixed outlet stud against the gasket in the outlet bushing of each pan. The outlet bushing 57 of each pan drops below its bottom level, as noted particularly in Fig. 5. In order to prevent any interference with the insertion or removal of any pan, each pan is provided with the receding lip 70, furnishing a space through which the outlet bushing of the next upper pan can move while keeping the pans identical in size and shape. Each pan therefore takes an identical volume of liquid. The outlet connections 61 terminating in the outlet 24 are also of identical size, and the withdrawal of liquid from the individual pans therefor proceeds uniformly and simultaneously with any given vacuum produced by the pump and effective to the outlet 24.

The draining of the tank housing of any residue may be accomplished by means of the drain valve 20.

Fig. 9 shows a modified embodiment of the filter press having a housing 80, a cover 81, and a hinged door 82. This door may be of triangular cross-section, as shown, and is provided on the inside with spacer strips or bars 83 corresponding in their purpose and function to the spacer strips 71 of the first described structure. The filter pans 84 are of downwardly-increasing size but of substantially identical shape, the front wall of each filter pan sloping again downwardly and inwardly, as indicated at 85, in the same manner as the filter pans of the first described structure. The liquid, again, is introduced marginally from the bottom substantially below the channels provided by the spacer strips 83, and flows upwardly and floods the filter pans through the spaces provided by the sloping sides thereof. The insertion or removal of the filter pans is in this case accomplished through the frontal space resulting from opening a door 82. The structure may be adopted for presses exceeding a certain size and capacity. Details not specifically described may correspond to the details of the previously explained structure, with such modification as may be made within the scope of this invention.

Changes and modifications may be made with respect to the detail parts and the arrangement or assembly thereof, and it is therefore understood that I do not desire the above description to be limited to the precise structures shown in the drawings. For example, it is not necessary to make the filter pans of rectangular shape. They may assume other shapes, including polygonal or circular or in part circular, without departing from the spirit of the invention. The valve 25 at the upper end of the common outlet 24 (Figs. 1 and 2) may be provided with an air vent if desired. What is believed to be new and desired to have protected by Letters Patent of the United States is pointed out and defined in the accompanying claims.

I claim as my invention:

1. A filter press comprising a housing, means on the inside of said housing forming vertically-extending marginal channels therein, means for conducting liquid to said channels, a plurality of filter pans removably disposed within said housing one above the other and constituting a like plurality of filter beds, each of said filter pans having a lip for alignment with said channels for receiving liquid therefrom, an outlet bushing on each of said pans, an outlet stud in the wall of said housing for removable substantially leakproof connection with the outlet bushings of said pans, a common outlet outside of said housing, and valve-controlled means connecting each of said outlet studs with said common outlet.

2. The structure defined in claim 1, wherein the means for conducting liquid to said channels comprises a pipe attached marginally to the bottom of said housing below said channels so as to introduce said liquid marginally and in an upward direction along said channels.

3. The structure defined in claim 1, together with means for pressing the outlet bushing of each of said pans against the corresponding outlet stud therefor so as to maintain relatively leakproof connection therebetween when said pan is in operating position within said housing.

4. The structure defined in claim 1 together with means for pressing the outlet bushing of each of said pans against the corresponding outlet stud therefor so as to maintain relatively leakproof connection therebetween when said pan is in operating position within said housing, said last named means comprising a handle for each pan which is yieldably attached thereto and engages the means forming the marginal in-flow channels on the inside of said housing.

5. A filter device comprising a relatively flat pan-like receptacle, filter means in said receptacle spaced from the bottom thereof whereby liquid placed thereinto is filtered downwardly into said bottom space, a tubular marginally disposed member in said pan for collecting the liquid filtered into said bottom space, a bushing connecting said tubular member with the outside for drawing said filtered liquid from said bottom space, and a gasket in said bushing for pressure connection with an outlet for said device.

6. The structure defined in claim 5, together with an inwardly-sloping wall on said receptacle, and handle means yieldably attached to said sloping wall.

7. The structure defined in claim 5, wherein said receptacle is rectangularly shaped, the wall on one side of said receptacle sloping inwardly and downwardly toward the bottom thereof, said tubular member for collecting the filtered liquid being disposed near the bottom and alongside the wall opposite said sloping side of said receptacle.

8. The structure defined in claim 5, together with a wave-shaped member interposed between said filter means and the bottom of said receptacle.

9. The structure defined in claim 5, wherein the bottom of said receptacle is wave-shaped and wherein said filter means is disposed thereon forming with said bottom a plurality of parallel channel spaces for receiving the filtered liquid.

10. A filter apparatus comprising a housing, a plurality of identically shaped filter pans of identical size removably disposed within said housing one above the other and constituting a like plurality of independent normally horizontally positioned superposed filter beds, each of said filter pans having a bottom portion and a side wall peripherally upwardly projecting therefrom and said side wall forming an outwardly and upwardly sloping lip over which liquid to be filtered is supplied to each pan, the upper edge of said side wall of each pan except the uppermost pan being disposed substantially in alignment with and in the plane of the bottom of the next pan above, a relatively shallow collecting space at the bottom of each pan, filter means covering said collecting space, an individual outlet for the bottom collecting space of each filter pan, a common outlet for all of the filter pans connecting with said individual outlets in substantially leakproof relation thereto, and means for supplying to said housing liquid to be filtered upwardly from the bottom so as to flood said pans successively over the upper edges of the lips formed in the side walls thereof.

11. The filter structure defined in claim 10, wherein the bottom of each filter pan rests marginally on the upper edge of part of the wall of the next lower pan.

12. The filter structure defined in claim 10, together with spacer bars disposed vertically on the inside wall of said housing forming vertical channels for conducting the liquid to be filtered upwardly within the housing to the lips formed on said pans.

13. The filter structure defined in claim 10, together with spacer bars disposed vertically on the inside wall of said housing forming vertical channels for conducting the liquid to be filtered upwardly within the housing to the lips formed on said pans, said lips resiliently contacting said spacer bars.

HENRY EICKEMEYER.